United States Patent
Li

(10) Patent No.: US 8,848,094 B2
(45) Date of Patent: Sep. 30, 2014

(54) OPTIMAL BLUR MATCHING SELECTION FOR DEPTH ESTIMATION

(75) Inventor: Pingshan Li, Sunnyvale, CA (US)

(73) Assignee: Sony Corporation, Tokyo (JP)

( * ) Notice: Subject to any disclaimer, the term of this patent is extended or adjusted under 35 U.S.C. 154(b) by 82 days.

(21) Appl. No.: 13/609,155

(22) Filed: Sep. 10, 2012

(65) Prior Publication Data

US 2013/0141630 A1 Jun. 6, 2013

Related U.S. Application Data

(60) Provisional application No. 61/565,829, filed on Dec. 1, 2011.

(51) Int. Cl.
*H04N 5/232* (2006.01)
*G03B 17/18* (2006.01)

(52) U.S. Cl.
CPC ............ *H04N 5/23212* (2013.01); *G03B 17/18* (2013.01)
USPC ....................................................... 348/348

(58) Field of Classification Search
CPC .............. H04N 5/232; H04N 5/23212; H04N 5/23232; H04N 5/23248; H04N 5/23254; G03B 13/00; G03B 13/36; G03B 3/00; G03B 17/18; G03B 19/12; G03B 7/28; G03B 13/16; G02B 7/36; G02B 7/284; G02B 7/34; G02B 21/244; G02B 7/102
USPC ....................................................... 348/348
See application file for complete search history.

(56) References Cited

U.S. PATENT DOCUMENTS

| | | | | |
|---|---|---|---|---|
| 2006/0285741 | A1* | 12/2006 | Subbarao | 382/154 |
| 2008/0118238 | A1* | 5/2008 | Sogawa et al. | 396/128 |
| 2010/0053382 | A1* | 3/2010 | Kuniba | 348/242 |
| 2010/0053417 | A1* | 3/2010 | Baxansky | 348/345 |
| 2011/0150447 | A1 | 6/2011 | Li | |
| 2011/0229052 | A1* | 9/2011 | Li et al. | 382/264 |
| 2011/0249173 | A1* | 10/2011 | Li et al. | 348/349 |

OTHER PUBLICATIONS

Yang, J. and Schonfeld D., "Virtual Focus and Depth Estimation from Defocused Video Sequences," IEEE Transactions on Image Processing, Mar. 2010, vol. 19, No. 2, pp. 668-679 (pp. 1-12).

United States Patent and Trademark Office, International Search Report (pp. 1-14), issued on Feb. 26, 2013 for related International Patent Application No. PCT/US12/69021 (U.S. Appl. No. 13/350,285) with claims searched (pp. 15-19) pp. 1-19.

European Patent Office, European Supplemental Search Report (pp. 1-8), issued on Mar. 15, 2013 for related European Patent Application No. EP 13150497.9-1553 (U.S. Appl. No. 13/350,285) with claims searched (pp. 9-11) pp. 1-11.

* cited by examiner

*Primary Examiner* — Aung S Moe
*Assistant Examiner* — Amy Hsu
(74) *Attorney, Agent, or Firm* — John P. O'Banion

(57) ABSTRACT

Autofocusing is performed in response to a capturing object images upon which multiple depth estimation techniques are applied to yield a plurality of iterations. An iteration from one of these depth estimation techniques is selected based on results, such as based on largest absolute value, and checked. If the iteration fails the check, another of the iterations is selected and tested. Once a valid iteration is found, additional focus positions are executed in like manner from which an accurate focus position is determined.

33 Claims, 12 Drawing Sheets

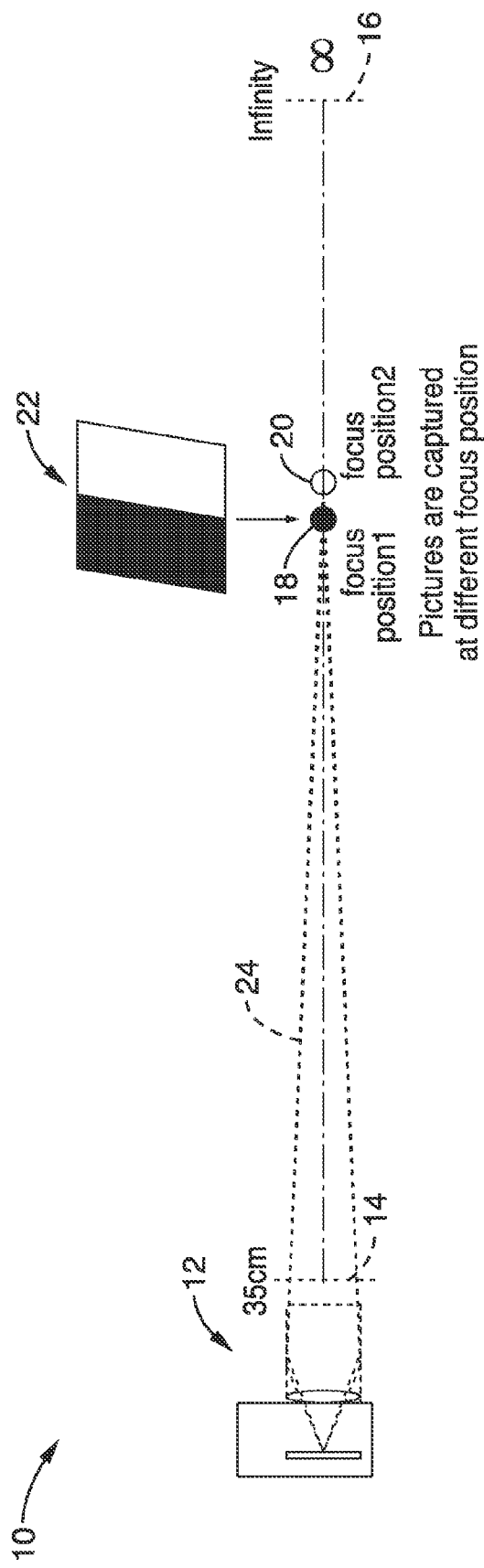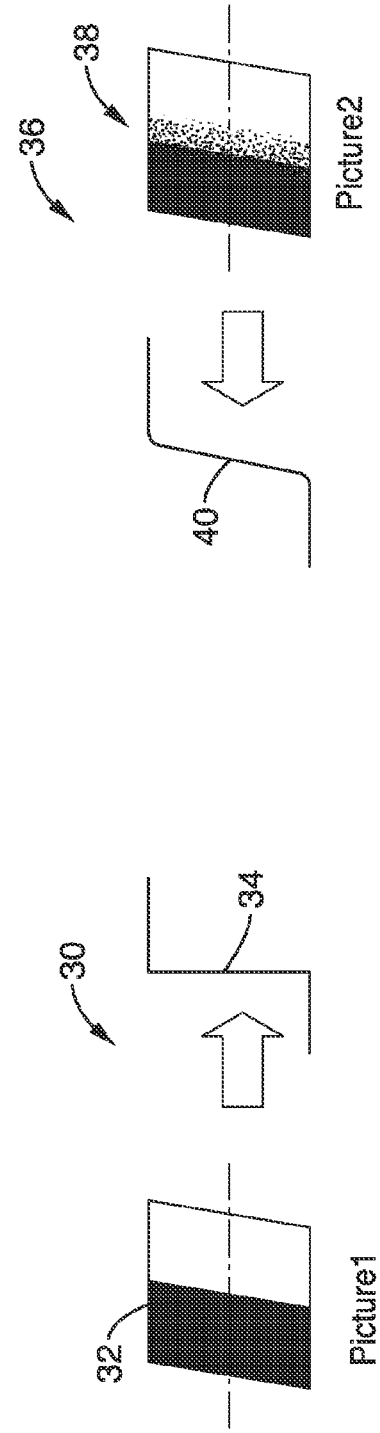
FIG. 1
FIG. 2A Picture1
FIG. 2B Picture2

OPTIMAL BLUR MATCHING SELECTION FOR DEPTH ESTIMATION

CROSS-REFERENCE TO RELATED APPLICATIONS

This application claims priority from U.S. provisional patent application Ser. No. 61/565,829 filed on Dec. 1, 2011, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to image acquisition, and more particularly to automatic image focusing mechanisms based on performing multiple forms of depth estimations at each lens position to optimize blur matching for the depth estimation process.

2. Description of Related Art

Image capture devices, in particular cameras, provide an automated mechanism for obtaining a correct focus on the subject. Autofocus (AF) is typically engaged in response to applying slight pressure to the shutter-release switch, such as pressing it half-way toward shutter release. In some applications, the autofocus feature continuously maintains focus, prior to capturing the image, or while capturing an image sequence or video.

During autofocus, the camera lens is automatically focusing on a three-dimensional scene and focus is controlled with respect to depth. A number of autofocus mechanisms are known in the art. One typical autofocus mechanism searches for a peak in the autofocus curve, for example utilizing the autofocus curve from image gradients. In response to the region of analysis becoming increasingly focused, image gradients become increasingly larger. It is the object of the autofocus algorithm is to obtain the peak of the autofocus curve while requiring transitions though a minimum number of camera focus positions. However, existing focus mechanisms are slow and often fail to converge on a proper focus and may continue "hunting" for a proper focal position.

Focus is perhaps the most critical metric in capturing a desired image which has led to the development of a wide range of systems for estimating or attaining proper camera focus. As a camera-lens system has a number of related elements and characteristics, a brief discussion follows of these elements and their associated characteristics.

In general terms, the two main optical parameters of a photographic lens are maximum aperture and focal length. The focal length determines the angle of view, and the size of the image relative to that of the object (subject) for a given distance to the subject (subject-distance). The maximum aperture (f-number, or f-stop) limits the brightness of the image and the fastest shutter speed usable for a given setting (focal length/effective aperture), with a smaller number indicating that more light is provided to the focal plane which typically can be thought of as the face of the image sensor in a simple digital camera.

In one form of typical simple lens (technically a lens having a single element) a single focal length is provided and this lens is also referred to as a "prime lens". In focusing a camera using a single focal length lens, the distance between lens and the focal plane is changed which results in altering the focal point where the photographic subject image is directed onto the focal plane. Thus, although the single focal length lens has a fixed optical relation and focal length, it is used in the camera to focus on subjects across a focal range span. The fixed focal distance of a lens should not be confused with the range of focal distances obtainable on a camera using that lens, and it will be noted that adjusting the position of the lens in relation to the focal plane alters focal distance.

In using a single focal length lens, the aperture is adjusted to select the amount of light with respect to desired shutter speed, and focus is adjusted according to subject-distance, which is also referred to as the focal distance, after which one or more images are captured. Often a macro setting is provided with a different focal length selection, on an otherwise single focal length lens, to allow capturing close-up shots. In contrast, a telephoto lens provides a very narrow angle of view with high magnification for filling the frame with an image of distant objects.

Multi-focal length lenses are usually referred to as "zoom" lenses, because image magnification can be "zoomed", or "unzoomed" as the case may be. Zoom lenses allow the user to select the amount of magnification of the subject, or put another way, the degree to which the subject fills the frame. It is important to understand that the zoom function of these lenses, or camera-lens systems, is conceptually separate from both the focus control and the aperture control, although in practice zoom lens operation even in the best of systems still slightly impacts other settings.

It is always necessary, however, to properly focus the lens for a given subject-distance irrespective of whether a single-focal length lens or multi-focal length lens is utilized. An acceptable range of focus for a given focus setting is referred to as "depth of field" which is a measurement of depth of acceptable sharpness in the object space, or subject space. For example, with a subject distance of fifteen feet, an acceptable range of focus for a high definition camera may be on the order of inches, while optimum focus can require even more precision. It will be appreciated that depth of field increases as the focusing moves from intermediate distances out toward "infinity" (e.g., capturing images of distant mountains, clouds and so forth), which of course at that range has unlimited depth of field.

For a single focal length lens at a given aperture setting there exists a single optimum focus setting for a given distance from camera to the subject (subject-distance). Portions of the subject which are closer or farther than the focal distance of the camera will show up in the captured images subject to an amount of blur which depends on many factors that impact depth of field. However, in a multi-focal lens there is an optimum focus point for each lens magnification (lens focal length) obtainable by the lens. To increase practicality, lens makers have significantly reduced the need to refocus in response to zoom settings, however, the necessity for refocusing depends on the specific camera-lens system in use. In addition, the aperture setting can require changing in response to different levels of zoom magnification.

In early cameras the focus could only be determined and corrected in response to operator recognition and manual focus adjustments. However, in response to the critical nature of proper focus, aids were readily adopted. In more recent times, imaging devices usually provide the ability to automatically focus on the subject, a function which is generically referred to today as "auto focus". Focus continues to be a point of intense technical development as each of the many existing auto focus mechanisms are subject to shortcomings and tradeoffs.

There are two general categories of auto focus (AF) systems which exist, (1) active auto focus and (2) passive auto focus. In active auto focus, one or more image sensors are utilized to determine distance to the focal point, or otherwise detect focus external of the image capture lens system. Active AF systems can perform rapid focusing although they will not typically provide proper focusing through windows, or in other specific applications, since sound waves and infrared light are reflected by the glass and other surfaces. In passive auto focus systems the characteristics of the viewed image are used to detect and set focus.

The majority of high-end single-lens reflex (SLR) cameras currently use through-the-lens optical AF sensors, which for example, may also be utilized as light meters. The focusing ability of these modern AF systems can often be of higher precision than that achieved manually through an ordinary viewfinder.

In one form of passive AF, phase detection is utilized, such as by dividing the incoming light through a beam splitter into pairs of images and comparing them on an AF sensor. Two optical prisms capture the light rays coming from opposite sides of the lens and divert it to the AF sensor, creating a simple rangefinder with a base identical to the diameter of the lens. Focus is determined in response to checking for similar light intensity patterns and the phase difference is calculated to determine if the object is considered in front of the focus or in back of the proper focus position.

In another type of passive AF system, contrast measurements are made within a sensor field through the lens. The system adjusts focus to maximize intensity difference between adjacent pixels which is generally indicative of correct image focus. Thus, focusing is performed until a maximum level of contrast is obtained. This form of focusing takes longer (is slower) than active AF, in particular when operating under dim light, but is a common method utilized in low end imaging devices.

Passive systems are notoriously poor at making focal decisions in low contrast conditions, notably on large single-colored surfaces (solid surface, sky, and so forth) or in low-light conditions. Passive systems are dependent on a certain degree of illumination to the subject (whether natural or otherwise), while active systems may focus correctly even in total darkness when necessary. In addition, problems arise with use of blur matching whose curves do not always fit the calibrated model.

Accordingly, a need exists for a system and method of controlling camera focusing depth estimation methods in a more robust and deterministic manner. These needs and others are met within the present invention, which overcomes the deficiencies of previously developed autofocus systems and methods.

BRIEF SUMMARY OF THE INVENTION

The present invention teaches determining a focus position using a combination of any desired depth estimation methods to provide rapid and accurate focusing, such as in autofocusing camera systems.

Previous Sony autofocusing systems individually utilize a single depth estimation technique for determining camera image depth, and thus focus positioning. Different applications separately addressed use of defocused imaging (either Gaussian blur or pillbox blur imaging), convolution with wavelet transforms, and two-picture matching forms of depth estimation. These depth estimation methods, and other multiple picture matching mechanisms, can be utilized in combination in the present invention.

By way of example and not limitation the present invention provides a description of depth estimation using two-picture matching with multiple picture combinations in a blur matching method that adapts blur matching with adaptive model fitting and slope correction. The use of maximum absolute deviation provides a measure of data fitting the focus blur model, with large deviations indicative of a mismatch between the model and matching data. This error is corrected by adjusting the slope of the matching data sample, or alternatively adjusting the parameters of the model.

These benefits are extended herein, by performing multiple forms of depth estimation at each lens position, determining which of these estimations provide optimal blur matching, and then using the best result estimation in the depth focusing process.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a schematic of capturing multiple images at multiple focal points according to an aspect of the present invention.

FIGS. 2A and 2B are schematics of calibration target (e.g., step edge) images according to an aspect of the present invention.

DETAILED DESCRIPTION OF THE INVENTION

Figure 3:
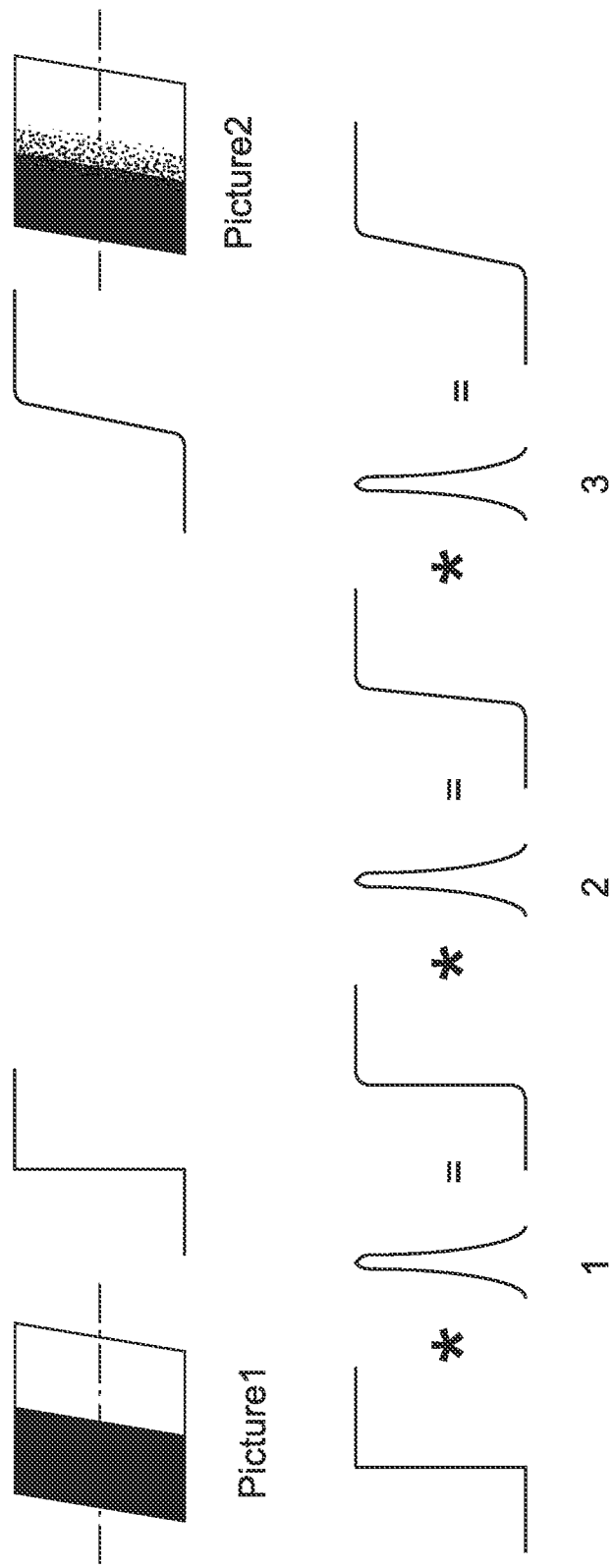
FIG. 3 is a schematic of computing blur difference in three iterations according to an aspect of the present invention.

Autofocusing utilizing two-picture or multi-picture matching, or any single depth estimation technique, is unable to provide accurate results in all circumstances, such as in response to distortion from saturation, cut-off and noise. The next section provide a background on the general use of one form of depth estimation based on a two picture blur-matching technique, and is followed by teachings of using multiple depth estimation techniques in the focusing process.

As the subject comes into focus, the captured image will be the sharpest, which means it has the highest contrast. The subject becomes blurrier (less contrast) as the lens moves away from the in-focus position. Generally, when two pictures are taken at two different focus distances, the one captured closer to the subject distance is sharper than the other. The focus distances at which the pictures are taken and the amount of blur difference between these pictures is utilized according to invention for estimating actual subject distance, or depth.

FIG. 1 illustrates an embodiment 10 in which multiple images are captured of a calibration target (or subject), at different focal positions (subject-distances) when characterizing a given imaging apparatus (e.g., specific make or model of camera). An imaging device (camera) 12 is shown which can focus from a minimum focal length 14 on out to infinity 16. Minimum focal distance 14 (e.g., in this case 35 cm) is shown as well as focus at infinity 16. According to the invention, the focus converges to first focal position 18 and then to a second focal position 20, upon a calibration target 22, such as step-edge image, slate, graticule, or similar target having known optical characteristics, along focal path 24. By way of example, the focusing distance of the camera ranges between the minimal focus distance (e.g., 35 cm) to infinity.

FIG. 2A depicts a condition 30 in which subject 32 is in focus, wherein the captured image is the sharpest, as represented by the sharp contrast curve 34, which is also referred to as the "edge profile" of the step edge. It will be appreciated that the calibration target, or subject, preferably provides a mechanism for simply determining the sharpness of focus based on contrast. For example in a step-edge target, a clear step-edge delineation is made between at least two colors, shades, luminances, wherein the sharpness of focus can be readily determined from the sharpness of the contrast profile. It will be appreciated by one of ordinary skill in the art that the target can be configured in any of a number of different ways, in a manner similar to the use of different chroma keys and color bar patterns in testing different aspects of video capture and output.

FIG. 2B depicts the condition 36 as the image of object 38 becomes increasingly blurry as the lens moves away from the 'in-focus' position, with a resulting sloped contrast curve 40 shown. Generally, when two pictures are taken at two different focal distances, the one taken closer to the subject-distance is sharper than the other. The focal distances at which the pictures are taken and the amount of the blur difference between these two pictures can be used to estimate the actual subject distance, or depth.

Consider the case where two pictures $f_A$ and $f_B$ are taken at positions A and B, with $f_A$ being sharper than $f_B$. The blur change can be modeled by a point spread function P from position A to B as $$f_A * P = f_B$$

where * denotes the operation of two dimensional convolution. Furthermore, the point spread function P can be approximated by using a series of convolutions by a blur kernel K:

$$P = K * K * \ldots * K \tag{1}$$

In the testing performing herein the kernel K was chosen as:

$$K = \frac{1}{64}\begin{pmatrix} 1 & 6 & 1 \\ 6 & 36 & 6 \\ 1 & 6 & 1 \end{pmatrix} \tag{2}$$

whereby the amount of blur difference between $f_A$ and $f_B$ can be measured by the number of convolutions in Eq. (1). In actual implementation, the blur difference is obtained by an iterative process.

$$I_{A\_B} = \underset{I}{\operatorname{argmin}} \left\| f_A * \underbrace{K * K * \ldots * K}_{I \text{ convolutions}} - f_B \right\| \tag{3}$$

where $\|\cdot\|$ denotes a norm operator that evaluates the blur matching error between $f_A$ and $f_B$.

A matching curve is a relationship between the iteration number and the lens focusing position. In order to obtain the matching curve for a given depth, a sequence of pictures is taken for the whole focus range of the lens, after which the blur difference is calculated between every two pictures. The first picture of the sequence is taken at the focus distance of infinity, then one picture is taken every time the lens is moved to focus at one depth of field closer, until the lens reaches minimal focus distance. This sequence of pictures is denoted by $f_0, f_1, \ldots, f_{N-1}$, where N is the length of the sequence.

Estimating depth utilizing blur matching is performed in response to matching curve characteristics. It will be appreciated that the characteristics can be modeled by linear slopes or polynomials. During the autofocus process, pictures are taken at different focus positions. The blur difference between each two pictures is calculated, and the matching curve model utilized to estimate the depth.

In autofocus applications, the lens is traditionally moved to focus at the estimated distance, then the new depth is estimated in the same manner. The procedure is then preferably repeated until the iteration number converges to 0 (in-focus), or alternatively below some specified threshold. The best result of these estimated distances is considered to be the most recent depth estimation. This "most-recent-estimation"

approach, however, suffers from several drawbacks: (1) convergence is not guaranteed; (2) there is no assurance that the next depth estimation will provide more accuracy; (3) it is a slow process, especially when the matching curve is noisy; and (4) the method doesn't properly handle situations in which the blur difference result is faulty (e.g., an outlier).

In view of the above shortcomings, the estimation is performed across multiple images as described in previous applications of the inventors to readily obtain accurate focus.

The depth estimation error is designed as $$e = d - f \quad (4)$$

where d is estimated subject depth, and f is the actual subject depth. The error e is modeled using a Gaussian distribution $e \sim N(\mu, \sigma^2)$, in which the mean value $\mu$ represents the amount of estimation bias, while variance $\sigma^2$ is a measure of confidence level. The smaller the value of $\sigma^2$, the more confidence is provided by the estimation result.

When the lens position is moving farther from the actual in-focus position, then absolute value of the iteration number is larger and the confidence level of the depth estimation result is generally lower.

Accordingly, blur matching is preferably performed by combining estimation results when more than one lens movement is required during autofocusing, whereby both past and present focus estimates are utilized instead of only the most recent estimate which is based on only two pictures. The purpose for this can be understood as follows.

Suppose N pairs of images have already been captured during the autofocus process and N unbiased depth estimation results $d_1, \ldots, d_N$ have been obtained with $d_i \sim N(\mu, \sigma_i^2)$. The mean value $\mu$ is the actual subject depth. Assuming $d_i$, as depth estimations from the ith image pair, are independent, given $\sigma_i^2$, the Maximum Likelihood Estimation (MLE) of $\mu$ is given by the weighted mean:

$$\bar{d} = \frac{\sum_{i=1}^{N} (d_i / \sigma_i^2)}{\sum_{i=1}^{N} (1 / \sigma_i^2)} \quad (5)$$

$$\sigma_{\bar{d}}^2 = \frac{1}{\sum_{i=1}^{N} (1 / \sigma_i^2)} \quad (6)$$

This variance $\sigma_{\bar{d}}^2$ is smaller than any individual variance $\sigma_i^2$ for $d_i$, which means that the weighted mean $\bar{d}$ gives more confidence than any individual $d_i$ does. Therefore $\bar{d}$ is preferably utilized as a basis for autofocus instead of relying on only the most recent estimation. The convergence condition for this autofocus process arises in response to sufficient confidence in $\bar{d}$, or when $\sigma_{\bar{d}}^2$ is below a specified threshold. Each new estimation reduces the variance of the weighted mean. High accuracy focusing results can be obtained if enough lens movements and pictures are taken.

It should be appreciated when using the most-recent-estimation approach, that iterative lens movement needs to be stopped when it returns to a prior location, so as to prevent an infinite loop, in which convergence doesn't occur and a focus position is never attained. By contrast, in the preferred weighted mean approach, lens motion need not be stopped, as each new estimation leads to an increasing confidence level and improved focus.

For the most-recent-estimation method, the convergence condition arises when the iteration number is 0, or nearly 0, yet it does not function properly in response to noisy matching curves, an issue addressed fully in a later section.

If the depth estimation result is no better than using a random "guess", then the estimation provides no (zero) confidence. Technically, the confidence level is zero when the variance is infinity (uniform distribution).

Use of the weighted-mean method, or similar multiple estimator approaches, can provide information about focal confidence, from which appropriate action can be taken during autofocusing to prevent errant results. By way of example and not limitation, options for handling a no-confidence-estimation, include: (1) assign a large variance (e.g., 1000) to the estimation result and continue with the normal autofocus process; (2) discard this result, capture another set of images and calculate a new depth estimation; or (3) terminate the autofocus process. It should be appreciated that the ability to generate focus confidence values can be utilized in a number of different ways without departing from the teachings of the present invention.

Ideally, the blur variance difference between two images of 1 DOF apart is linear with respect to the lens focusing position. The calibrated blur model is obtained from blur matching results of a step edge image sequence. It is expected that the blur matching curve for natural scenes will come close to fitting the calibrated blur model.

However, when signals are distorted due to saturation, cut-off and noise, the blur matching curve can deviate from that of the calibrated model. The blur matching curve may become either too steep or too flat to give reasonable depth estimation results. To overcome this shortcoming, it was necessary to develop an adaptive model fitting algorithm to adaptively adjust the slope of the data samples to fit the model, or adjust the slope of the model to fit the data.

FIG. 3 illustrates, by way of example, a blur matching process in which three iterations are performed to match picture 2.

Figure 4:
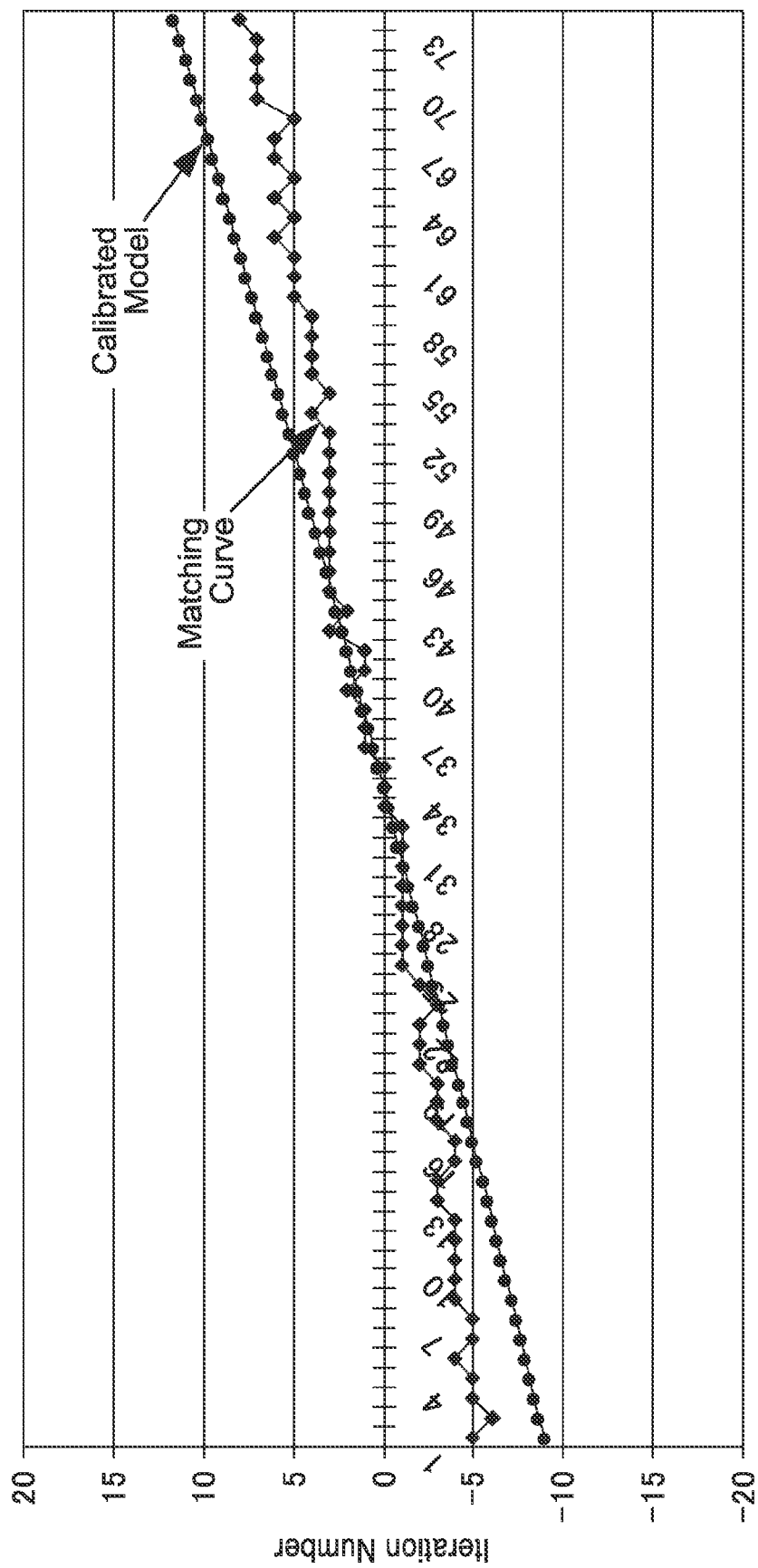
FIG. 4 is a graph of the matching curve being too flat in relation to the calibrated model, as corrected according to an embodiment of the present invention.
Figure 5:
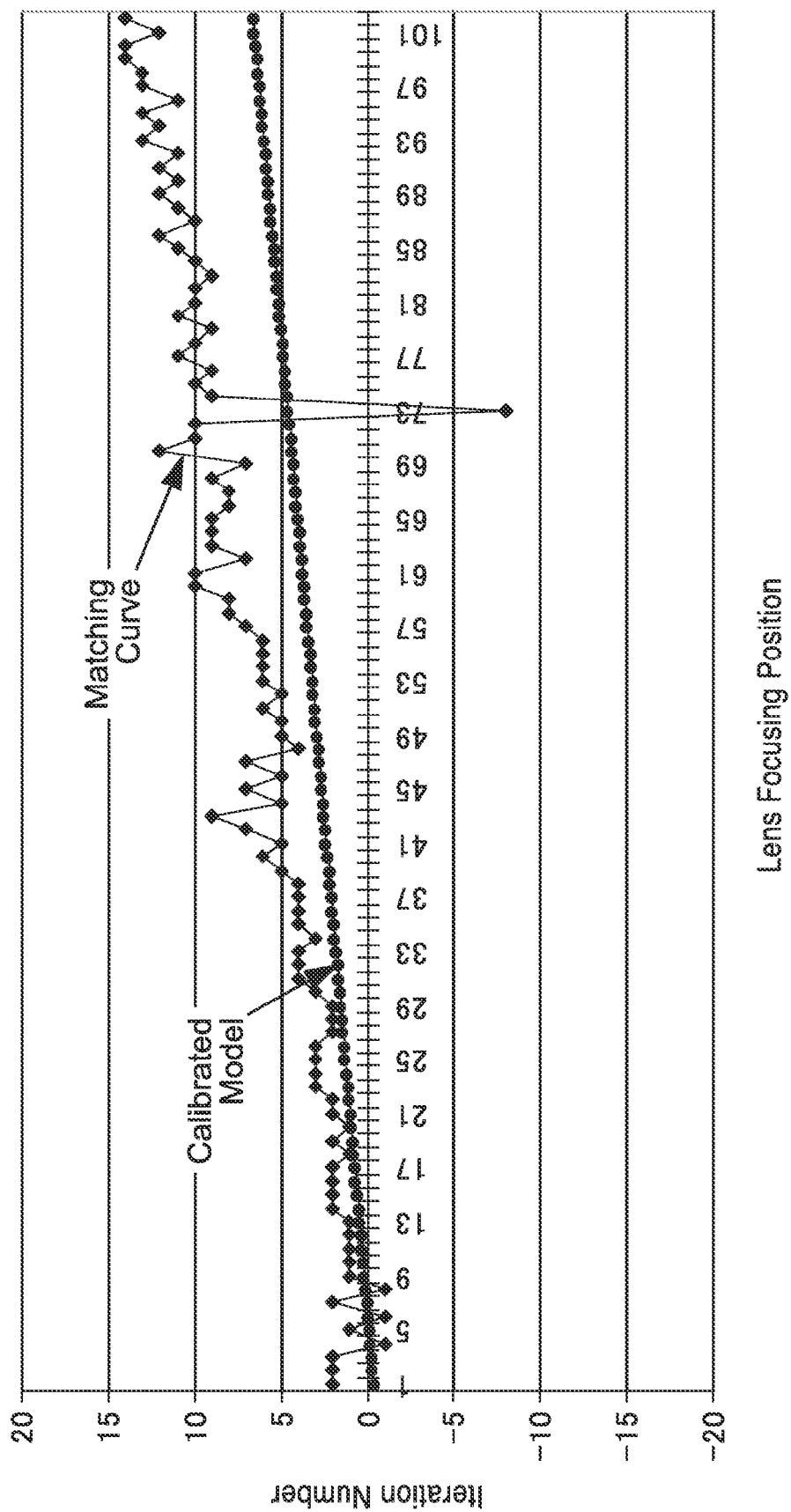
FIG. 5 is a graph of the matching curve being too steep in relation to the calibrated model, as corrected according to an embodiment of the present invention.

FIG. 4 through FIG. 5 depict examples in which the determined matching curve has a slope which is not suited to the calibrated model. In FIG. 4 the slope of the matching curve is too flat, while in FIG. 5 the slope of the matching curve is too steep.

Estimation error (AF) can be given by $e = d - \mu$ wherein e is the estimation error, N is the number of estimation results, d is the estimated focus position, and $\mu$ is the actual focus position. The error is preferably modeled with a Gaussian distribution $e \sim N(0, \sigma^2)$, with the variance $\sigma^2$ an indication of the reliability of the estimation result, which is referred to as the confidence level.

Toward achieving accurate focusing results and assuring convergence, it is preferable to combine all available estimation results. It will be noted that autofocus in response to single depth estimation utilizes only the most recent estimation value. However, when more than one lens movement is required during the auto focus (AF) process, then it is beneficial to use all the data collected instead of just the most recent two pictures.

Suppose that unbiased estimation results $d_1, \ldots, d_N$ have been collected with $d_i = N(\mu, \sigma_i^2)$. Because the mean value of $\mu$ is the actual focus position, it is problematic to estimate $\mu$ for the estimation sample $d_i$ given $\sigma_i^2$.

In one preferred embodiment a weighted mean is utilized. Assuming that $d_i$ are independent, the Maximum Likelihood Estimation (MLE) of $\mu$ is given by the weighted mean:

$$\bar{d} = \frac{\sum_{i=1}^{N}(d_i/\sigma_i^2)}{\sum_{i=1}^{N}(1/\sigma_i^2)} \quad (7)$$

whereby the variance of the weight mean is given by $$\sigma_{\bar{d}}^2 = \frac{1}{\sum_{i=1}^{N}(1/\sigma_i^2)} \quad (8)$$

Yet, it remains to determine how accurately these results fit the focusing model. The dispersion of the data can be determined according to the following data dispersion relation:

$$X_v^2 = \frac{1}{(N-1)}\sum_{i=1}^{N}\frac{(d_i-\bar{d})^2}{\sigma_i^2}$$

However, the use of data dispersion to search for optimal matching samples is computational expensive, while the optimal matching samples may be too different from the original matching results. It is generally preferable to utilize maximum absolute deviation to indirectly evaluate the data dispersion. Accordingly, maximum absolute deviation is utilized according to a preferred embodiment of the invention to evaluate how accurately the data fits the model according to:

$$D_v = \max_{i \in \{1, \ldots, N\}} \frac{|d_i - \bar{d}|}{\sigma_i} \quad (9)$$

It should be appreciated that a large value of $D_V$ indicates there may be a mismatch between the model and the matching data. Two different ways are described to correct this mismatch: (1) adjust the slope of the matching data sample to match the model, and/or (2) adjust the parameters of the model so that the model fits the data. It should be appreciated that modification of the model does not preclude performing slope corrected to a desired extent.

Figure 6:
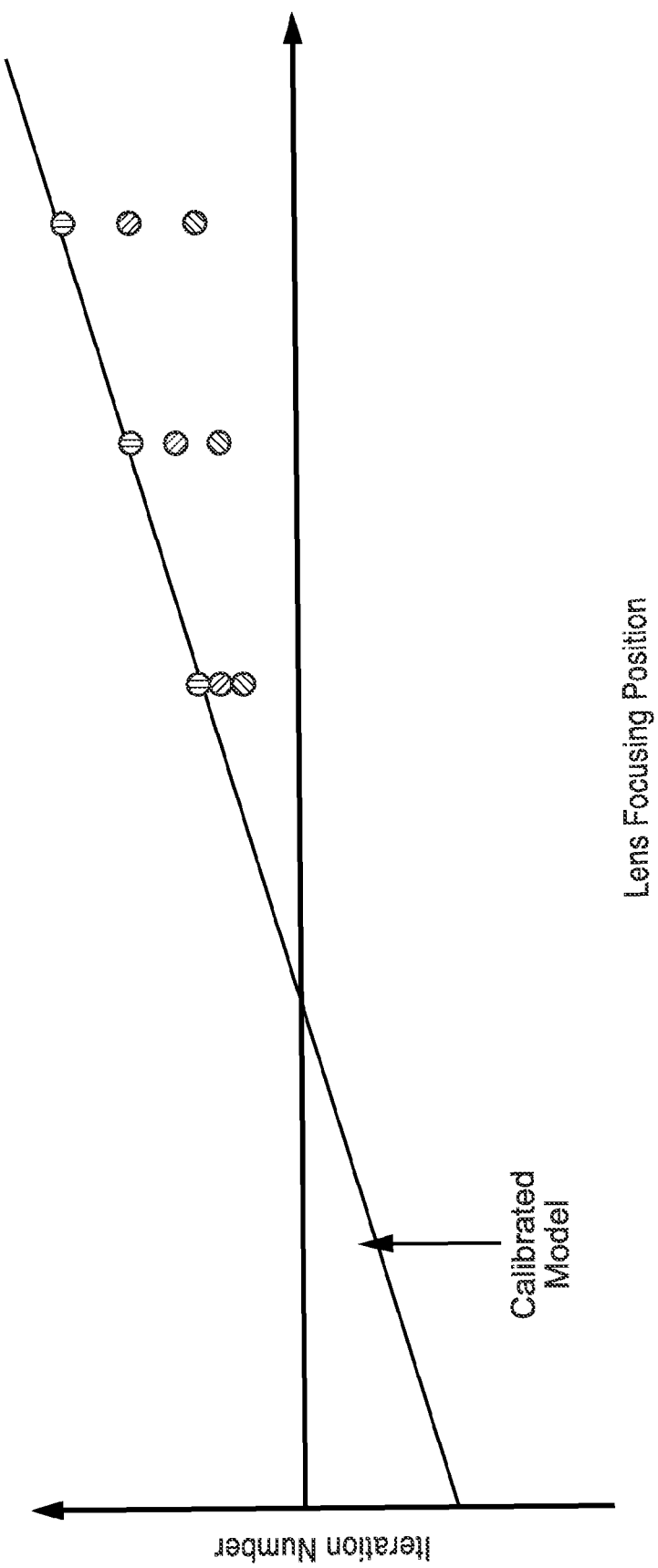
FIG. 6 is a graph of slope correction of matching data according to an embodiment of the present invention.

FIG. 6 illustrates the operation of slope correction of matching data. Slope correction of blur matching data is the multiplication of the matching iteration numbers by a constant so that these data points more accurately fit the calibrated model of blur matching.

In testing matching curves, the initial correction factor is set to be 1. For the given set of depth estimation results, the maximum absolute deviation $D_V$ is calculated. If $D_V$ is larger than a specified threshold, the initial correction factor is then updated by multiplying it by a correction value, such as one selected from a predetermined set of constants, for instance 1.25, 1.0 and 0.8 respectively. A correction factor is preferably chosen which yields the lowest value of maximum absolute deviation. In the case of the three example correction factors, for the given set of the initial iteration numbers, each iteration number is multiplied by the correction factor and maximum absolute deviation is then recalculated. The correction factor that results in the smallest maximum absolute deviation is chosen. Slope correction is performed when new pictures are captured and a new estimation is added to the weighted mean calculation. The chosen correction factor for the current set of estimation results is then used as the initial correction factor for the next round when the new estimation is added. As can be seen above, the chosen correction factor is updated every time by multiplying one of the three numbers 1.25, 1.0 and 0.8. To maintain the stability of the model, a bound is set for this chosen factor to be between 0.5 and 2.

Referring back to FIG. 6 the dots having the vertical hatching rotated 45 degrees counterclockwise (CCW dots) are the initial iteration number determined from blur matching, the dots shown with vertical hatching are the more accurately fitted iteration numbers which were corrected by a slope correction factor 1.25 in this particular example, but not by limitation as various correction factors could be utilized without departing from the teachings of the present invention. In this figure, the dots having the vertical hatching which is rotated 45 degrees clockwise (CW dots) represent an alternate slope correction value of 0.8, which was not selected as it was not well-suited to the calibrated model. It should be appreciated that the slope correction as described for FIG. 6 can be generally applied to any blur matching model, such as to polynomial models.

Figure 7:
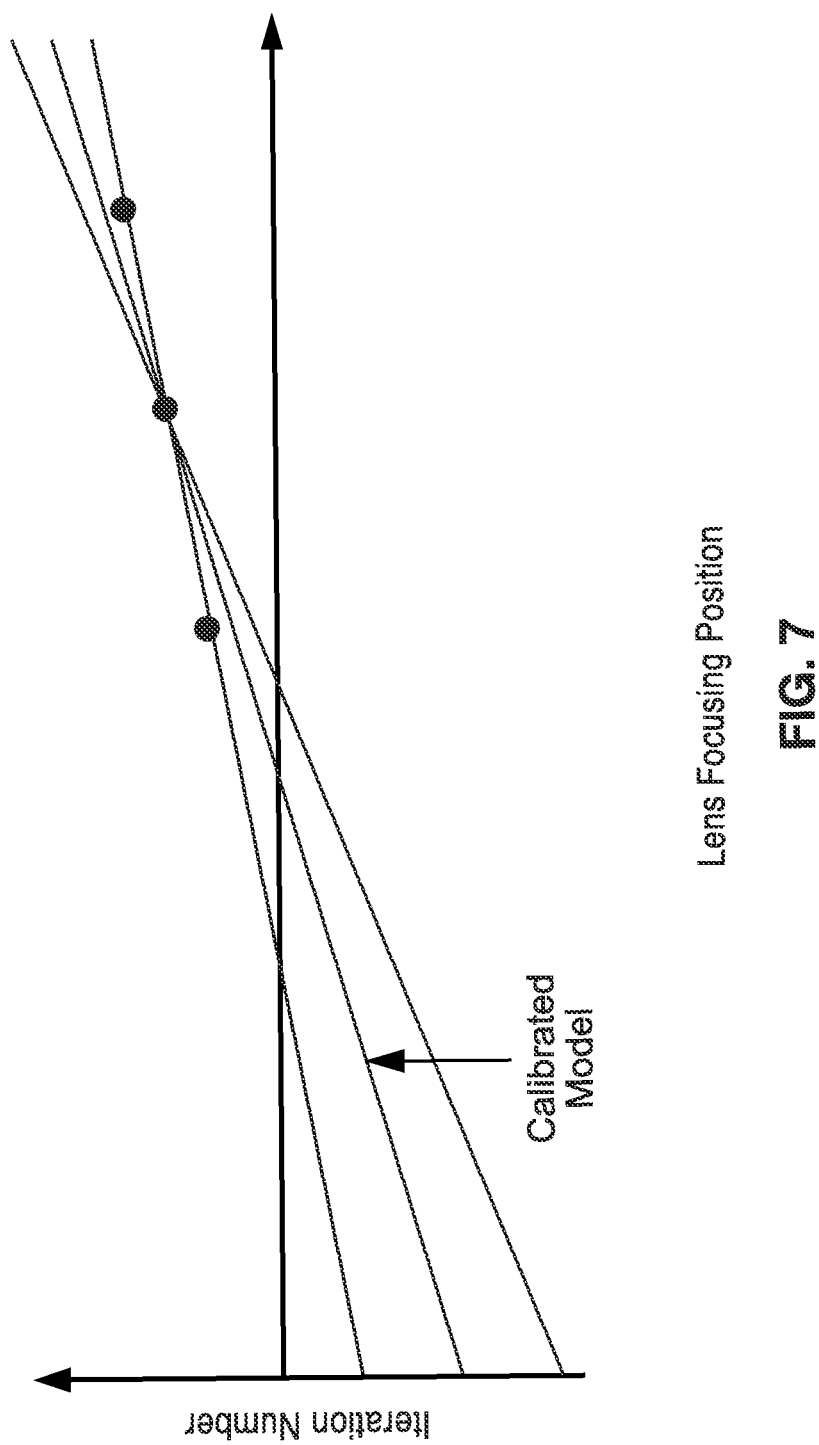
FIG. 7 is a graph of slope correction of the calibrated model according to an embodiment of the present invention.

FIG. 7 illustrates the operation of slope correction in the calibrated model according to another aspect of the invention. If the calibrated blur matching model is sufficiently linear, slope correction can be performed by multiplying the slope of the linear model by a constant correction value so that it more accurately fits the matching data samples. In testing, if the maximum absolute deviation is larger than a specified threshold, it was found for the given set of iteration numbers, that multiplying the slope of the model by correction factors 1.25, 1.0 and 0.8, and selecting the factor which yields the smallest absolute deviation value as the correction to be applied to the slope, yielded improved results.

It should be appreciated that the slope correction can be applied to nonlinear models as well. If the model is nonlinear, vertical stretching and compression is applied, instead of slope correction, by multiplying the iteration number in the model by a scale factor. In testing slope correction when the maximum absolute deviation is larger than a specified threshold, it was found for the given set of iteration numbers, that multiplying the scale factor for vertical stretching and compression by correction factors 1.25, 1.0 and 0.8, and selecting the factor which yields the smallest absolute deviation value as the correction to be applied to the model, yielded improved results. The initial value of scale factor before any correction should be set to 1. It will be appreciated that slope correction (or vertical stretching and compression for nonlinear model) is preferably performed once when a new estimation is added to the weighted mean calculation. In the figure shown, the dots are the matching data samples. The centermost line is the calibrated model. The line which is highest on the left of the figure is the new model obtained by selecting a slope correction factor 0.8, by way of example and not limitation, which provides the best fit between the data and the calibrated model. The modified slope (or modified scale factor) will be utilized as the initial slope (or initial scale factor) for the next round when new pictures are captured and new depth estimation is added to the weighted mean calculation. Similar to the method described in FIG. 6, the limit of overall slope correction (or the total amount of stretching and compression) can also be set to be between 0.5 and 2, which are the multiplication factors used to modify the calibrated blur matching model.

Figure 8:
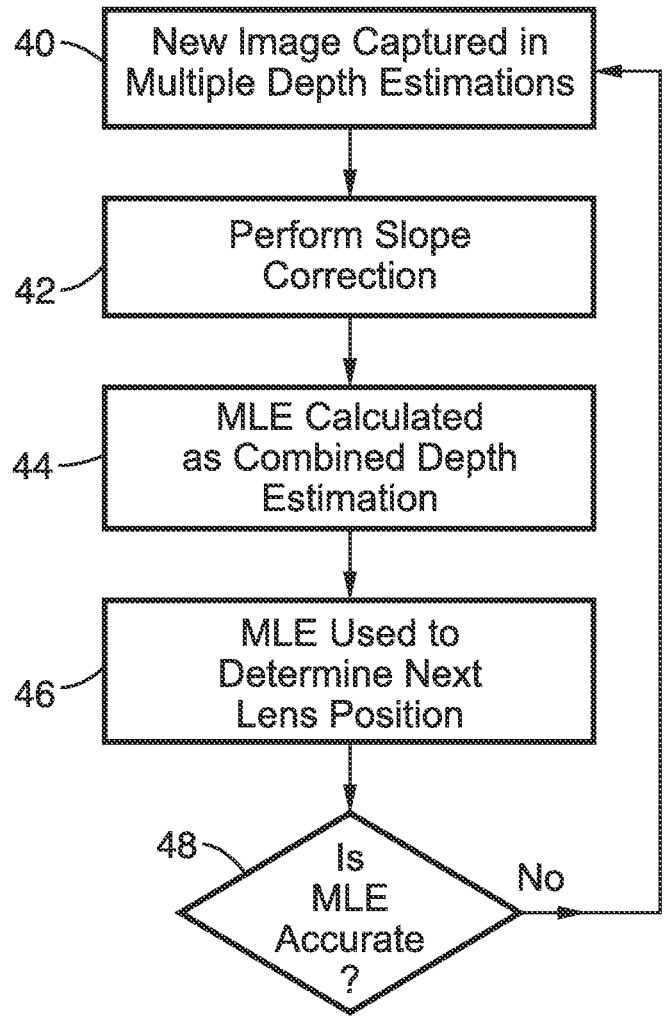
FIG. 8 is a flow diagram of performing slope correction of the blur matching depth estimation according to an embodiment of the present invention.

FIG. 8 illustrates an example of obtaining more accurate depth estimation results by performing slope correction within a multiple depth estimation process, such as utilized during autofocus adjustments within a camera. New images are captured 40, and the slopes are corrected 42, such as by either or both of the correction processes discussed in relation to FIG. 6 and FIG. 7. MLE of the depth estimations is calculated 44 and used as the combined depth estimation result, which is utilized 46 to determine the next lens position and the focusing lens moves to the new position. A determination is made 48, if the MLE is sufficiently accurate, such as based on variance, then no new images need be captured to increase autofocus accuracy, otherwise a new image is captured 40 and the process repeats with new images and new slope correction.

Thus, a weighted-mean is performed of past and present estimation results for each iteration of lens movement, and provides improvement over estimations based on only the most-recent estimation, while increasing accuracy in response to adaptive blur matching model fitting. The adaptive blur matching is particularly well suited in an autofocusing system or method.

Figure 9:
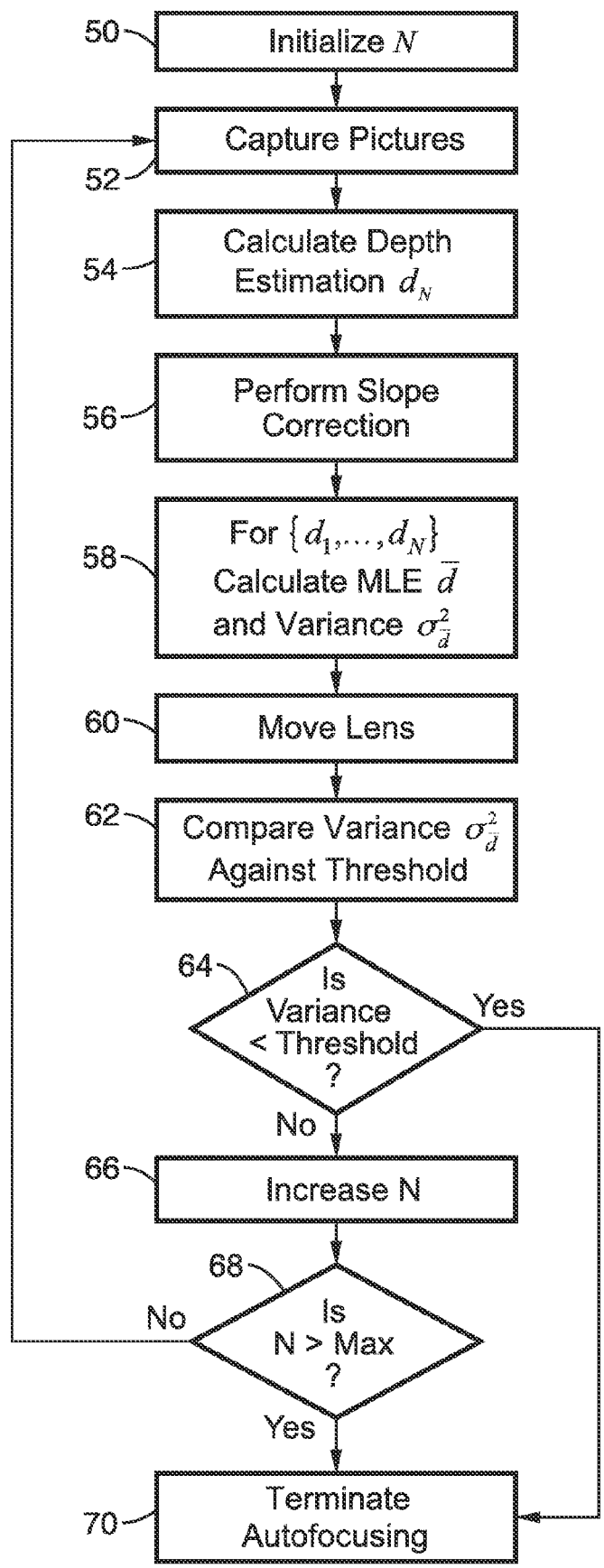
FIG. 9 is a flow diagram of performing weighted mean estimation using adaptive blur matching model fitting during autofocusing according to an embodiment of the present invention.

FIG. 9 illustrates a more detailed example embodiment of an autofocusing method utilizing the adaptive blur matching model fitting. In step 50 the process is initialized, with N=1. Pictures are taken as per step 52 and depth estimation $d_N$ calculated as per step 54. Slopes are corrected in step 56, such as by the mechanisms shown in FIG. 6 and FIG. 7. For all $\{d_1, \ldots, d_N\}$ MLE $\bar{d}$ and its variance $\sigma_{\bar{d}}^2$ are calculated in step 58. The lens is moved as per block 60 to a depth indicated by MLE $\bar{d}$. A comparison is performed 62 between variance $\sigma_{\bar{d}}^2$ and a specified threshold. If the variance is below the threshold (or alternatively equal to or less than the threshold) as determined at step 64, then the autofocus process is terminated at step 70. Otherwise if $\sigma_{\bar{d}}^2$ is larger, then N is increased, such as by 1 (N=N+1) in step 66. A check on the size of N is performed as per step 68, and if N is bigger than the maximum allowed number of lens movements for autofocus, the autofocus process can be terminated 70, while otherwise processing can continue back at step 52. It should be appreciated that if variance is still excessive, even though the maximum value of N has been reached (detected in step 68) then options other than termination of autofocusing can be selected without departing from the teachings of the present invention. It should be appreciated that the techniques are particularly well-suited for still image cameras, although it may be utilized in video cameras in which autofocus is always active regardless of whether MLE is accurate of not, because the scenes may change during video capture.

In the above processes of FIG. 8 and FIG. 9 the number of focusing movements are counted. If it is determined that an excessive number of focuses movements have been performed, such as a number exceeding a threshold value, then autofocusing is preferably terminated at the current focus position. It should be appreciated, however, that other responses to an excessive number of focus movements can be provided, and that other focusing algorithms other than depth estimation methods may be utilized.

It should be appreciated that depth estimation can be implemented on a variety of devices and systems which are configured to perform any of a number of different forms of image capture. By way of example and not limitation the following describes an embodiment within a camera device.

Figure 10:
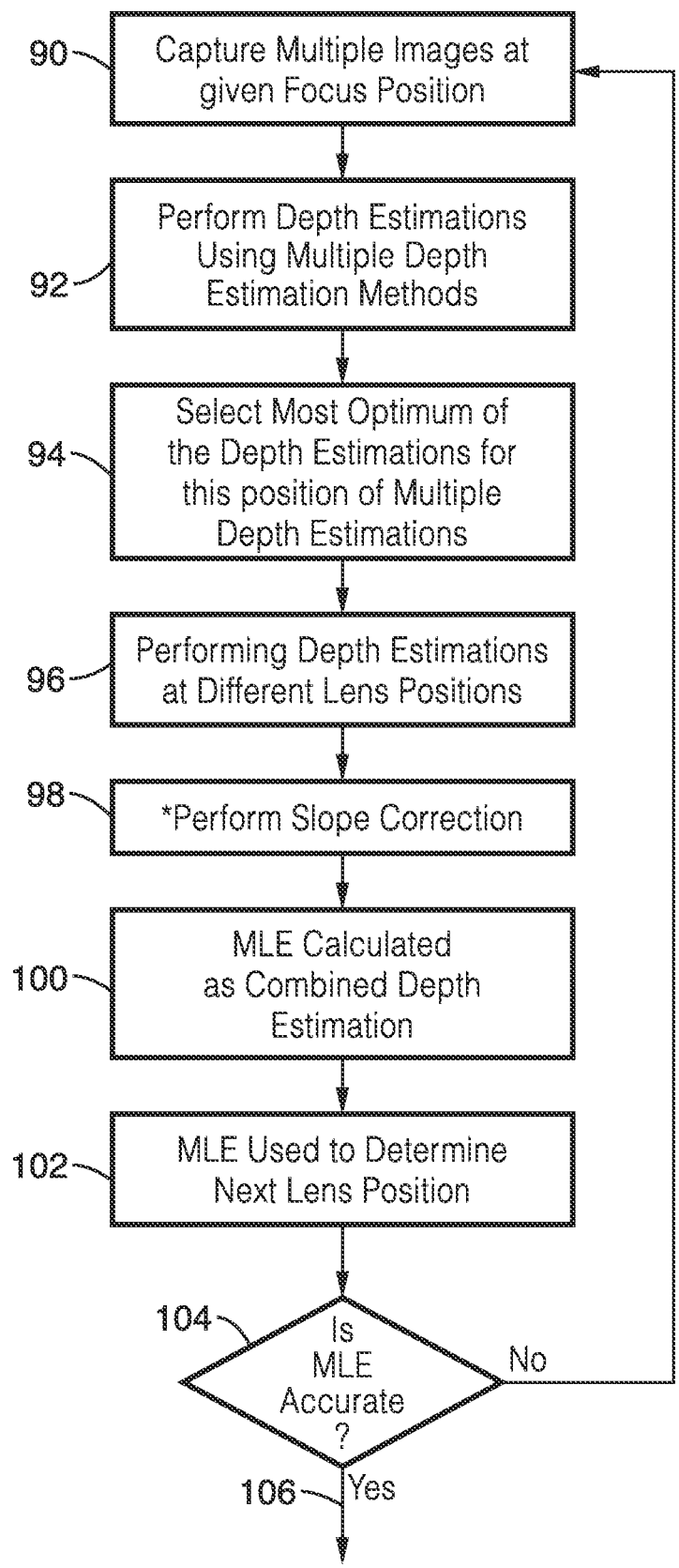
FIG. 10 is a flow diagram of performing depth estimation using optimal blur matching according to an embodiment of the present invention, showing performing multiple depth estimations using different estimation techniques for each lens position.

FIG. 10 illustrates embodiments of performing multiple forms of depth estimation. The process extends that described in FIG. 8 and FIG. 9, and instead of performing a single form of depth estimation at each focus position, preferably followed by a correction; multiple depth estimations (e.g., two) are performed (FIG. 10) for each focal position, and the best estimate determined (FIG. 11) for proceeding with the focus process.

In FIG. 10 is it seen that multiple images are captured 90 at a given focus position upon which multiple depth estimation methods are applied 92. The preceding sections of this application describe one such depth estimation. The following describes briefly a few other depth estimation methods.

In one method of defocused imaging depth estimation is performed under extreme lighting conditions in response to defocused images. Defocused image F is captured, after which camera focus is changed and defocused image G is captured. A kernel K is selected following by convolving image F with kernel K to produce convolved image F. If G has saturated pixels, then these are substituted into convolved image F, and the images G and F compared. The process continues until the images match.

In another method depth estimation is performed utilizing defocused pillbox images, which utilizes convolution between two blurred images as above.

In another method the above methods are combined, with depth estimation performed to identify either a Gaussian scene or a pillbox scene, after which depth estimation is performed.

In still another method, motion robust depth estimation is performed using convolution and wavelet transforms. Blur change is modeled as a point spread function, and convolution performed to approximate a point spread function. Wavelet transforms are performed and wavelet variances determined. Absolute difference is determined between wavelet variances as blur difference estimation, and the above steps repeated until convergence using one or more kernels. It should be appreciated that each of the above are provided by way of example of depth estimation techniques that can be utilized with the present invention, however, the present invention can be utilized with any form of depth estimation.

Returning to the discussion of FIG. 10, in step 94 the most optimum of these estimations are selected for use. Images are captured as above, across different (e.g., at least two) lens positions at step 96. In at least one embodiment, correction is performed at step 98, such as the slope correction previously described. It should be appreciated that the slope correction is optional in FIG. 10 as depicted by an asterisk in the flowchart. The elements of performing depth estimations using multiple methods per lens position, and determining the optimum result can be utilized without correction if desired. MLE of the depth estimations is calculated 100 and used as the combined depth estimation result (e.g., across lens positions and multiple estimations per position), which is utilized 102 to determine the next lens position and focusing lens moves to the new position. A determination is made 104, if the MLE is sufficiently accurate, such as based on variance, then no new images need be captured to increase autofocus accuracy, otherwise a new image is captured 90 and the process repeats with new images and new slope correction.

Figure 11:
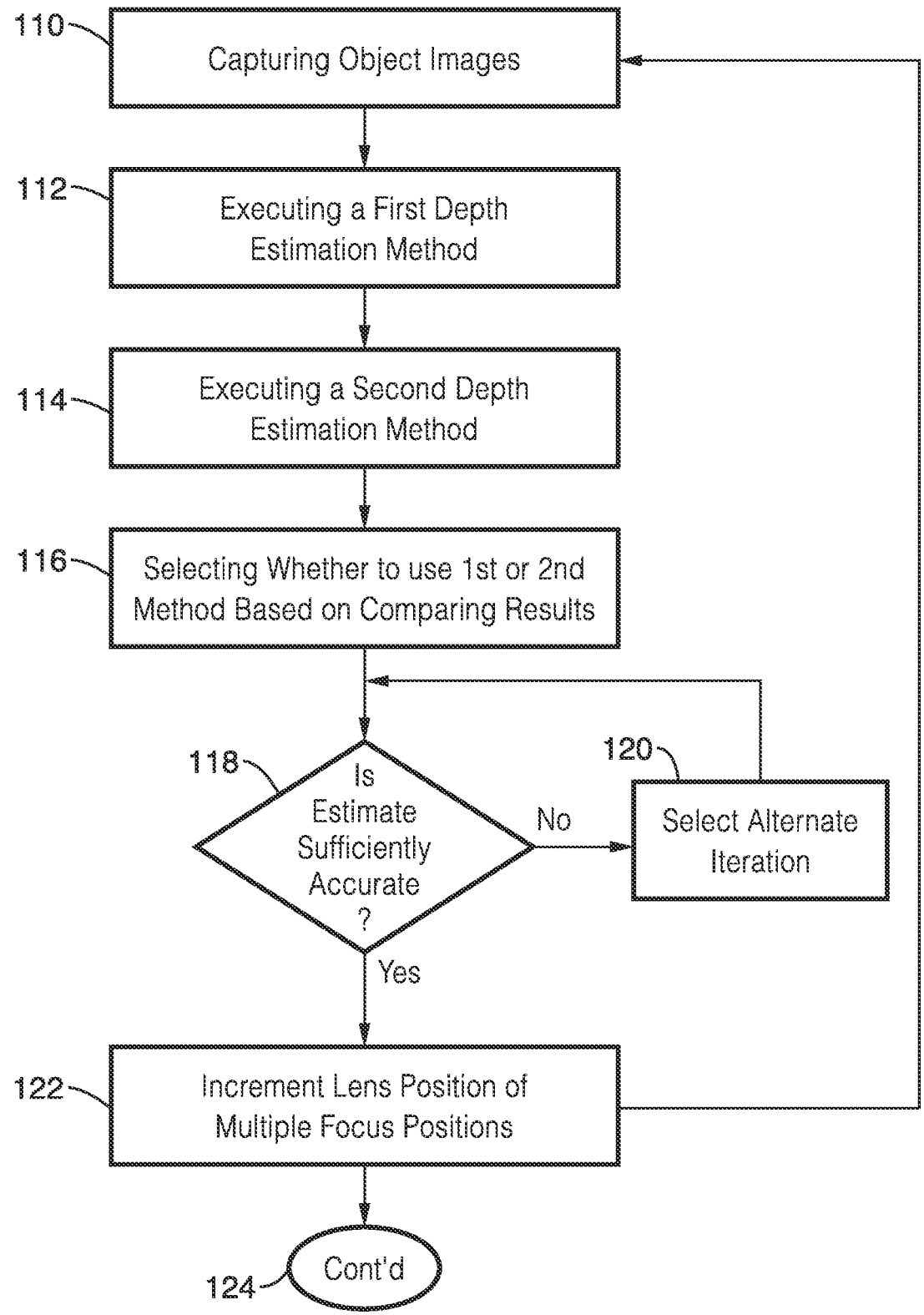
FIG. 11 is a flow diagram of performing depth estimation using optimal blur matching according to an embodiment of the present invention, showing more specifics on using multiple depth estimations methods.
Figure 12:
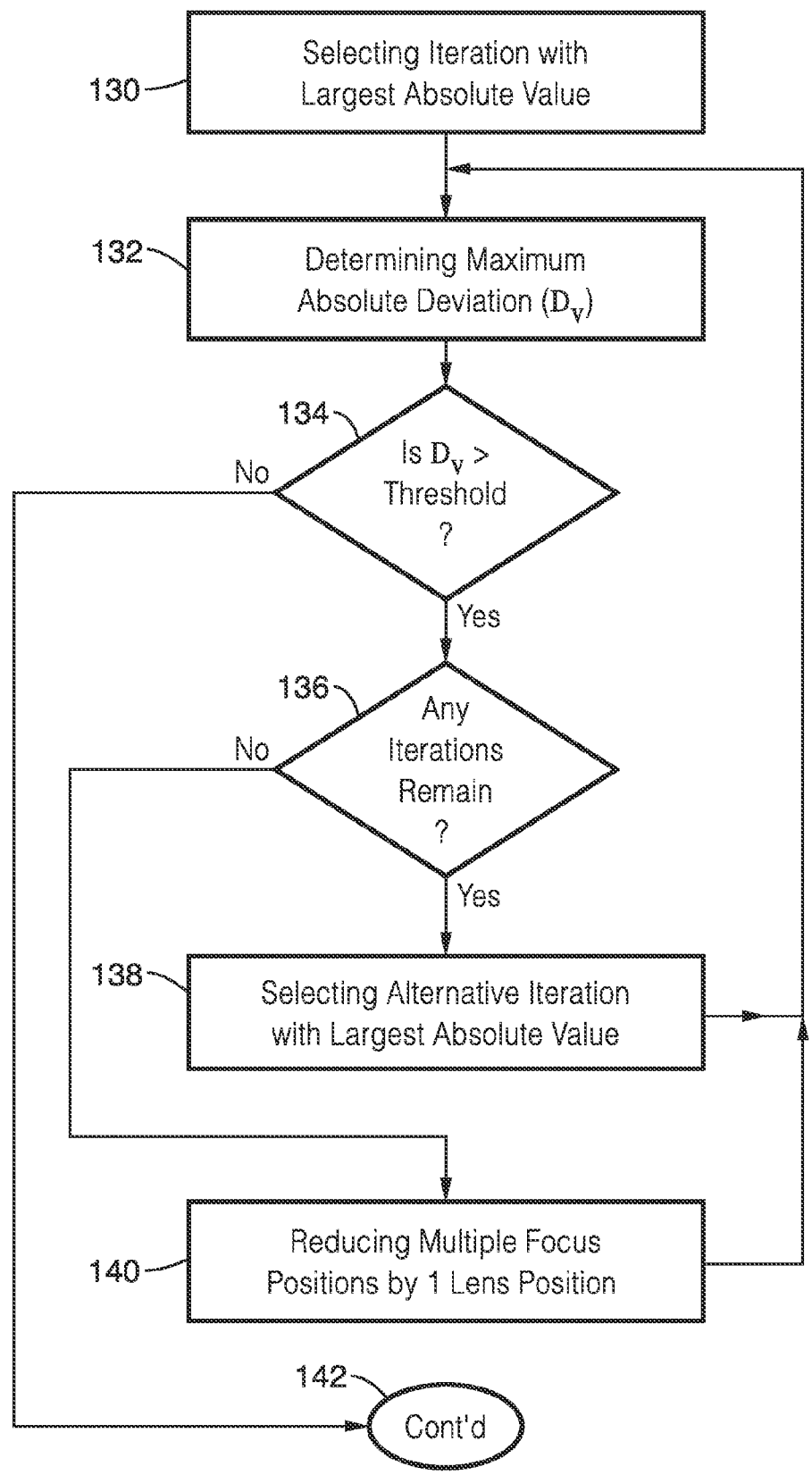
FIG. 12 is a flow diagram of selecting an iteration generated by the multiple depth estimation methods according to an embodiment of the present invention.

FIG. 11 illustrates an example embodiment of depth estimation in summary. Object images are captured at step 110, upon which a first depth estimation method 112 is performed, followed by a second depth estimation method 114. In step 116 a selection is made between the first and second depth estimation methods based on comparing results. A determination is made 118 if the estimate is sufficiently accurate. If it is accurate, then it can be used in the focus process, with the lens position being moved (incremented) to the next of multiple lens positions as in step 122, and autofocus continuing 124. If the selected iteration is incorrect, or not sufficiently accurate, then an alternate iteration is selected 120 and tested again 118. More detail of an embodiment of this is seen in FIG. 12.

It should also be appreciated that the selection of which results to use from the different depth estimation methods can be performed after capturing object images at all, or a number of, focus positions.

In prior Sony depth estimation techniques there are two iteration numbers to choose from. After two pictures are obtained, picture 1 and picture 2, an iteration number is obtained by assuming picture 1 is sharper than picture 2, and another iteration number by assuming picture 2 is sharper than picture 1. So one is left with one positive iteration number and one negative iteration number, whereby the one with the larger absolute value is selected as the final iteration number.

In the case of utilizing two methods for the same two pictures as in the present invention, there is a positive and a negative iteration number obtained from each method, whereby there are four iteration numbers to choose from. In at least one implementation, the iteration number is chosen with the largest absolute value. These iterations are checked either as they are performed, or after images are captured at multiple lens positions, with other iterations being selected and checked to replace one with high levels of error. Unless optimal matching selection and slope correction are performed, this would be the final iteration number for depth estimation for the current lens position. It should be appreciated that the inventive technique need not be limited to two methods, as utilizing more methods, provides more depth estimation results to choose from to enhance accuracy.

Now assuming one iteration number has been chosen at each lens position, there is one depth estimation result at each lens position. After several lens movements, multiple depth estimation results are obtained. These depth estimations across the multiple positions are then processed according to maximum absolute deviation $D_V$.

FIG. 12 illustrates an example embodiment of selecting an iteration from multiple depth estimation methods. The flowchart shows the general steps in the process which are discussed in more detail in the following section. In at least one embodiment the iteration is first selected 130 with the largest absolute value. Maximum absolute deviation $D_V$ is determined 132, and if the iteration indicates a good value (not above a threshold), as detected in step 134, then it is used with the other focus positions in estimating focus depth as that process continues 142. Otherwise, if the maximum absolute deviation is over the threshold, then a check is performed 136 to determine if iterations remain. This iteration may be obtained at this focus position, or from another. If additional iterations exist, then one is selected 138, preferably with the largest absolute value, and the process loops back to step 132 in determining maximum absolute deviation. However, if there are no more iterations, then step 140 is performed which discards all these iteration results, and in a preferred embodiment reduces 140 the number of focus positions by one lens position, and proceeds back to 132 to recalculate $D_V$. It should be appreciated that at step 140 there may be iterations remaining at other lens positions to choose from if $D_V$ is still larger than threshold.

Once a proper set of iterations across the lens positions is obtained, maximum absolute deviation $D_V$ is calculated according to Eq. 9 across the multiple depth estimation results. If the value of $D_V$ is larger than a desired threshold (e.g., predetermined threshold), then a problem exists in at least one depth estimation result at some lens position. The value of $D_V$ indicates which lens position is yielding an improper result.

Consider the case where the value of $D_V$ indicates that the depth estimation result at the first lens position is wrong. At this lens position, there exist four iteration numbers, and according to at least one embodiment the one with the largest absolute value was initially chosen. However, as the value of $D_V$ indicates this lens position is incorrect, another of the remaining iterations must be chosen, aside from those previously eliminated when checking the results from each of the depth estimation results. Typically, there will remain three other iteration numbers at this lens position. For example, the iteration is chosen with the second largest absolute value of the four iteration numbers. Then $D_V$ is recalculated. If $D_V$ is still larger than the threshold, this time maybe the chosen iteration number from some other lens position is wrong, or may be the newly chosen one at the same lens position is wrong. In either case, a new iteration number is chosen from the lens position indicated by the value of $D_V$. In this example embodiment, the iteration number is always chosen in the decremental order of the absolute value of the iteration numbers. However, it should be appreciated that other criterion may be equally utilized for initially selecting iterations. Upon all the errors being corrected or removed, a weighted mean is computed and used as the final estimated depth.

In case that all four iteration numbers at some lens position indicate an error, then all four results for this lens position are preferably discarded, and the number of lens positions used for MLE (Eq. 7) is reduce by one. This process is then repeated until $D_V$ is lower than the threshold.

It should be noted that matching selection are "reset" after an iteration is found with $D_V$ lower than the threshold. Upon selecting an iteration, the lens is moved to the next lens position based on the MLE, whereafter a new pair of pictures is captured and new iteration numbers calculated. Prior to performing a new round of matching selections, the previous matching selection results are reset as if this is the first time matching selection is performed, such as for each position including the previous ones, again the iteration number is chosen with the largest absolute value of the four iteration numbers as the initial selection. Then optimal matching selection is performed.

It should also be appreciated that Maximum Likelihood Estimation (MLE) value adjustments are performed after MLE is calculated, but before $D_V$ is calculated. By way of example and not limitation, the unit of estimated depth used herein is DOF (Depth of Field), with the depth being measured as number of DOF's from infinity. Therefore, at infinity depth is 0, with anything closer than infinity being positive depth. The result of the MLE calculation is estimated depth. If the value of MLE is not found to be between infinity and closest focus distance of the camera, then the system makes adjustments to MLE. If MLE is negative (farther than infinity), then MLE is set to 0 (infinity distance). If MLE is closer than the closest focus distance, then MLE is set to the closest focus distance. If the MLE is already within the range, it is left unchanged.

A check on $D_V$ is performed after this MLE adjustment. Performing a $D_V$ check generally means to compute $D_V$ and check whether it exceeds a threshold, and if so find out which iteration number causes the problem. If depth estimation results are available from just one lens position, then $D_V$ will be zero without this MLE adjustment, which means the depth estimation is always good. With this adjustment, $D_V$ can show whether MLE is actually a good estimate or not. If not, the system chooses other iteration numbers to improve the estimate, as was described in a prior section.

In the case of multiple lens positions, additional MLE adjustments are made. Following initial selection of iteration numbers at each lens position, the system has different depth estimation results from each lens position. Sometimes, there are some contradictions among these depth estimation results. For example, the depth estimation result from a lens position that is closer to the camera may indicate that the in-focus position should be even closer than the current lens position, while the depth estimation result from another lens position that is farther (closer to infinity) may indicate the in-focus position is even farther than the current lens position. Since they contradict one another, they can't both be correct. So a first check is made whether there are contradictions or not. If there is a depth estimation contradiction, the system stops making additional MLE adjustments and just lets a $D_V$ check decide which result is incorrect. If there is no contradiction, then we are left with the following three possibilities. (1) All depth estimation results from multiple lens positions say the in-focus position is closer to the camera than the current lens positions. The MLE should be in the range of between the closest lens position among those the depth estimation are made from and the camera's closest focus distance. (2) All depth estimation results say the in-focus position is farther than the current lens positions. The MLE should be within the range of between infinity and the farthest lens position among those the depth estimation are made from. (3) The depth estimation results from the farther lens positions say the in-focus position should be closer and the depth estimation results from the closer lens positions say the in-focus position should be farther. The MLE should be within the range of between the closest lens position that says the in-focus position should be closer and the farthest lens position that says the in-focus position is farther. After the additional MLE adjustment is made according to (1), (2) and (3), then the system proceeds to the normal $D_V$ check.

The above blur matching selection can be combined with the slope correction in two different ways. (1) Before blur matching selection begins, slope correction can be applied once for a given set of iteration numbers. (2) For each candidate slope correction factor (e.g., 1.25, 1.0 and 0.8), perform blur matching selection. The slope correction factor that yields final matching results closest to the original matching result is chosen. Of course the slope correction result is not reset as the matching selection described above. The following describes the basics of slope correction on a current set of estimation results. Alternatively, the parameters of the model may be adjusted instead of performing the slope correction, and utilized with this optimal blur matching selection for depth estimation elements of the invention.

Figure 13:
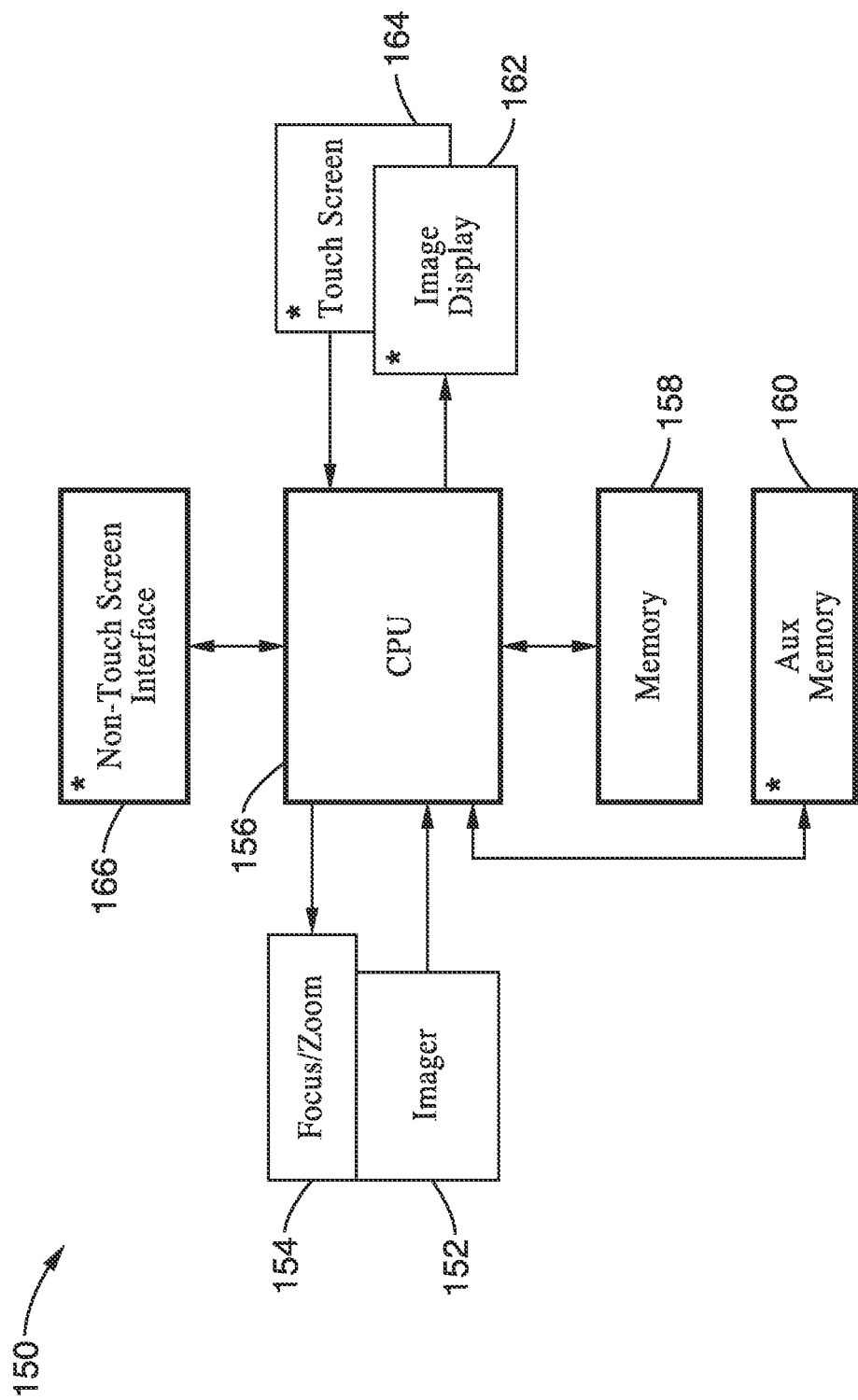
FIG. 13 is a block diagram of a camera which performs autofocusing optimal blur matching selection for depth estimation according to an embodiment of the present invention.

FIG. 13 illustrates an example embodiment 150 of an image capture device (camera) configured for autofocusing utilizing optimal blur matching selection according to the invention. The elements depicted (160, 162, 164, 166) with an asterisk indicate camera elements which are optional in the present invention. A focus/zoom control 154 is shown coupled to imaging optics 152 as controlled by a computer processor (e.g., one or more CPUs, microcontrollers, and/or DSPs) 156. Computer processor 156 performs the autofocusing method with optimal blur matching in response to instructions executed from memory 158 and/or optional auxiliary memory 160. Shown by way of example for a still camera device are an optional image display 162 and optional touch screen 164, and optional non-touch screen interface 166, however, it will be appreciated that the method according to the present invention can be implemented on various image capture devices which are configured with imager, focus control, computer processor and memory. The presence of a zoom, touch-screen, image display, non-touch screen interface, and auxiliary memory are not necessary in the image capture device for practicing the present invention, but are shown as they exist on typical camera systems.

It should be appreciated that the autofocus steps generally shown in FIG. 8 through FIG. 12 are performed by computer processor 156 in combination with memory 158 and/or auxiliary memory 160.

The present invention provides methods and apparatus of camera focus control. Inventive teachings can be applied in a variety of camera apparatus and applications which require automatic focusing aspects, including still cameras, and so forth.

From the description herein, it will be further appreciated that the invention can be embodied in various ways, which include but are not limited to the following.

1. An apparatus for controlling automatic focus, comprising: (a) an imaging device; (b) a focus control element coupled to said imaging device and providing a focal range to said imaging device; (c) a computer processor coupled to said imaging device and said focus control element, and configured for controlling said imaging device and associated focus control element; and (d) programming executable by said computer processor for carrying out an autofocusing process comprising: (i) capturing object images; (ii) performing a first depth estimation method on said images; (iii) performing a second depth estimation method on said images; (iv) selecting said first depth estimation method, or said second depth estimation method, based on comparing their results for use in focusing; (v) performing steps (i) through (iv) at multiple focus positions to arrive at an accurate depth estimation; and (vi) adjusting focus with a focusing movement performed in response to said accurate depth estimation.

2. The apparatus of any of the preceding embodiments, wherein said selecting based on comparing their results comprises programming executable by said computer processor for: (a) selecting an iteration with the largest absolute value from multiple iterations; (b) determining maximum absolute deviation for said iteration; (c) selecting one iteration from remaining iterations if the maximum deviation is determined to be above a desired threshold; and (d) repeating steps (b) through (c) until an iteration is found with maximum deviation that is below said desired threshold, or until no more iterations remain.

3. The apparatus of any of the preceding embodiments, wherein said one iteration from remaining iterations is selected based on determining largest absolute value of remaining iterations.

4. The apparatus of any of the preceding embodiments, further comprising programming executable by said computer processor for reducing said multiple focus positions by one lens position if no more iterations remain.

5. The apparatus of any of the preceding embodiments, further comprising programming executable by said computer processor for performing slope correction between a blur matching curve and a calibrated model.

6. The apparatus of any of the preceding embodiments, further comprising programming executable on said computer processor for performing slope correction of blur matching data in response to multiplying matching iteration numbers by a constant to accurately fit the calibrated model of blur matching.

7. The apparatus of any of the preceding embodiments, further comprising programming executable on said computer processor for performing slope correction of a calibrated model of blur matching by multiplying slope by a constant to accurately fit matching data samples.

8. The apparatus of any of the preceding embodiments, further comprising programming executable on said computer processor for determining that a desired level of focus accuracy is obtained in response to computing a variance which reaches a value indicating sufficient confidence that a proper focus position has been attained.

9. The apparatus of any of the preceding embodiments wherein said variance comprises a measure of confidence, which is generated by said programming executable on said computer processor in response to consideration of all depth estimations made during said autofocusing process.

10. The apparatus of any of the preceding embodiments: wherein said variance comprises a measure of confidence, which is generated by said programming executable on said computer processor in response to depth estimations which are predicted during said autofocusing process; and wherein said variance is determined as a weighted mean $\sigma_{\bar{d}}^2$ given by $$\sigma_{\bar{d}}^2 = \frac{1}{\sum_{i=1}^{N}(1/\sigma_i^2)}$$

where N represents number of unbiased depth estimations performed during said autofocusing process and $\sigma_i^2$ is variance for the i th depth estimation.

11. The apparatus of any of the preceding embodiments, wherein said adjusting focus is performed in response to combining present and previous depth estimations instead of only utilizing most recent depth estimations.

12. The apparatus of any of the preceding embodiments, wherein said depth estimation from said capturing object images is performed between captured image pairs, each image of which is taken at a different focus position, and estimating actual depth based on a depth estimation method between captured images within the image pair.

13. The apparatus of any of the preceding embodiments, wherein said depth estimation is performed using maximum likelihood estimation (MLE) of subject depth.

14. The apparatus of any of the preceding embodiments, wherein said apparatus is a component of a still image camera.

15. An apparatus for electronically capturing images, comprising: (a) an imaging device; (b) a focus control element coupled to said imaging device and providing a focusing range to said imaging device; (c) a computer processor coupled to said imaging device and said focus control element; and (d) programming executable on said computer processor for carrying out an autofocusing process comprising: (i) capturing object images; (ii) performing a first depth estimation method on said images; (iii) performing a second depth estimation method on said images; (iv) selecting said first depth estimation method, or said second depth estimation method, based on comparing their results for use in focusing; (v) performing steps (i) through (iv) at multiple focus positions to arrive at an accurate depth estimation; and (vi) adjusting focus with a focusing movement performed in response to said accurate depth estimation.

16. The apparatus of any of the preceding embodiments, wherein said selecting based on comparing their results comprises programming executable by said computer processor for: (a) selecting an iteration with the largest absolute value from multiple iterations; (b) determining maximum absolute deviation for said iteration; (c) selecting one iteration from remaining iterations if the maximum deviation is determined to be above a desired threshold; and (d) repeating steps (b) through (c) until an iteration is found with maximum deviation that is below said desired threshold, or until no more iterations remain.

17. The apparatus of any of the preceding embodiments, wherein said one iteration from remaining iterations is selected based upon largest absolute value of remaining iterations.

18. The apparatus of any of the preceding embodiments, further comprising programming executable by said computer processor for reducing said multiple focus positions by one lens position if no more iterations remain.

19. A method of automatically adjusting camera focus, comprising: (a) capturing a pair of object images by a camera device; (b) performing a first depth estimation method on said images; (c) performing at least a second depth estimation method on said images; (d) selecting use of said first depth estimation method, or said second depth estimation method based on comparing their results; and (e) performing steps (a) through (d) at multiple focus positions to arrive at an accurate depth estimation; and (f) adjusting focus with a focusing movement performed in response to said accurate depth estimation.

20. The method of any of the preceding embodiments, wherein said selecting based on comparing their results comprises: (g) selecting an iteration with the largest absolute value from multiple iterations; (h) determining maximum absolute deviation for said iteration; (i) selecting one iteration from remaining iterations if the maximum deviation is determined to be above a desired threshold; and (j) repeating steps (h) through (i) until an iteration is found with maximum deviation that is below said desired threshold, or until no more iterations remain.

It should be appreciated that programming is executable from one or more memories which are tangible (physical) computer readable media that is non-transitory in that it does not merely constitute a transitory propagating signal, but is actually capable of retaining programming, such as within any desired form and number of static or dynamic memory devices. These memory devices need not be implemented to maintain data under all conditions (e.g., power fail) to be considered herein as non-transitory media.

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formula, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for controlling automatic focus, comprising:
   (a) an imaging device;
   (b) a focus control element coupled to said imaging device and providing a focal range to said imaging device;
   (c) a computer processor coupled to said imaging device and said focus control element and configured for controlling said imaging device and associated focus control element; and
   (d) programming executable on said computer processor for carrying out an autofocusing process comprising:
      (i) capturing object images;
      (ii) performing a first depth estimation method on said images;
      (iii) performing a second depth estimation method on said images;
      (iv) selecting said first depth estimation method, or said second depth estimation method, based on comparing their results for use in focusing;
      (v) performing steps (i) through (iv) at multiple focus positions to arrive at an accurate depth estimation;
      (vi) adjusting focus with a focusing movement performed in response to said accurate depth estimation; and
      (vii) determining that a desired level of focus accuracy is obtained in response to computing a variance which reaches a value indicating sufficient confidence that a proper focus position has been attained.

2. The apparatus recited in claim 1, wherein said selecting based on comparing results comprises programming executable by said computer processor for:
   (viii) selecting an iteration with the largest absolute value from multiple iterations;
   (ix) determining maximum absolute deviation of depth estimation for said iteration; and
   (x) selecting one iteration from remaining iterations if the maximum deviation is determined to be above a desired threshold;
   (xi) repeating steps (viii) and (ix), until an iteration is found with maximum deviation that is below said desired threshold, or until no more iterations remain.

3. The apparatus recited in claim 2, wherein said one iteration from remaining iterations is selected based on determining largest absolute value of remaining iterations.

4. The apparatus recited in claim 2, further comprising programming executable on said computer processor for reducing said multiple focus positions by one lens position if no more iterations remain.

5. The apparatus recited in claim 1, further comprising programming executable on said computer processor for performing slope correction between a blur matching curve and a calibrated model.

6. The apparatus recited in claim 1, further comprising programming executable on said computer processor for performing slope correction of blur matching data in response to multiplying matching iteration numbers by a constant to accurately fit the calibrated model of blur matching.

7. The apparatus recited in claim 1, further comprising programming executable on said computer processor for performing slope correction of a calibrated model of blur matching by multiplying slope by a constant to accurately fit matching data samples.

8. The apparatus recited in claim 1, wherein said variance comprises a measure of confidence, which is generated by said programming executable on said computer processor in response to consideration of all depth estimations made during said autofocusing process.

9. The apparatus recited in claim 1:
   wherein said variance comprises a measure of confidence, which is generated by said programming executable on said computer processor in response to depth estimations which are predicted during said autofocusing process; and
   wherein said variance is determined as a weighted mean $\sigma_d^2$ given by $$\sigma_d^2 = \frac{1}{\sum_{i=1}^{N}(1/\sigma_i^2)}$$

where N represents number of unbiased depth estimations performed during said autofocusing process and $\sigma_i^2$ is variance for the i th depth estimation.

10. The apparatus recited in claim 1, wherein said adjusting focus is performed by programming executable on said computer processor in response to combining present and previous depth estimations instead of only utilizing most recent depth estimations.

11. The apparatus recited in claim 1, wherein said first and second depth estimation from said capturing object images is performed by programming executable on said computer processor between captured image pairs, each image of which is taken at a different focus position, and estimating actual depth based on a depth estimation method between captured images within the image pair.

12. The apparatus recited in claim 1, wherein said depth estimation is performed by programming executable on said computer processor using maximum likelihood estimation (MLE) of subject depth.

13. The apparatus recited in claim 1, wherein said apparatus is a component of a still image camera.

14. An apparatus for electronically capturing images, comprising:
   (a) an imaging device;
   (b) a focus control element coupled to said imaging device and providing a focusing range to said imaging device;
   (c) a computer processor coupled to said imaging device and said focus control element; and
   (d) programming executable on said computer processor for carrying out an autofocusing process comprising:
      (i) capturing object images;
      (ii) performing a first depth estimation method on said images;
      (iii) performing a second depth estimation method on said images;
      (iv) selecting said first depth estimation method, or said second depth estimation method, based on comparing their results for use in focusing, by:
         (iv)(1) selecting an iteration with the largest absolute value from multiple iterations;
         (iv)(2) determining maximum absolute deviation of depth estimation for said iteration;
         (iv)(3) selecting one iteration from remaining iterations if the maximum deviation is determined to be above a desired threshold; and
         (iv)(4) repeating steps (iv)(2) and (iv)(3) until an iteration is found with maximum deviation that is below said desired threshold, or until no more iterations remain;
      (v) performing steps (i) through (iv) at multiple focus positions to arrive at an accurate depth estimation; and
      (vi) adjusting focus with a focusing movement performed in response to said accurate depth estimation.

15. The apparatus recited in claim 14, wherein said one iteration from remaining iterations is selected based upon largest absolute value of remaining iterations.

16. The apparatus recited in claim 14, further comprising programming executable on said computer processor for reducing said multiple focus positions by one lens position if no more iterations remain.

17. A method of automatically adjusting camera focus, comprising:
   (a) capturing a pair of object images by a camera device;
   (b) performing a first depth estimation method on said images;
   (c) performing at least a second depth estimation method on said images;
   (d) selecting use of said first depth estimation method, or said second depth estimation method based on comparing their results, by
      (i) selecting an iteration with the largest absolute value from multiple iterations;
      (ii) determining maximum absolute deviation of depth estimation for said iteration;
      (iii) selecting one iteration from remaining iterations if the maximum deviation is determined to be above a desired threshold; and
      (iv) repeating steps (ii) and (iii), until an iteration is found with maximum deviation that is below said desired threshold, or until no more iterations remain;
   (e) performing steps (a) through (d) at multiple focus positions to arrive at an accurate depth estimation; and
   (f) adjusting focus with a focusing movement performed in response to said accurate depth estimation.

18. An apparatus for controlling automatic focus, comprising:
   (a) an imaging device;
   (b) a focus control element coupled to said imaging device and providing a focal range to said imaging device;
   (c) a computer processor coupled to said imaging device and said focus control element and configured for controlling said imaging device and associated focus control element; and
   (d) programming executable on said computer processor for carrying out an autofocusing process comprising:
      (i) capturing object images;
      (ii) performing a first depth estimation method on said images;
      (iii) performing a second depth estimation method on said images;
      (iv) selecting said first depth estimation method, or said second depth estimation method, based on comparing their results for use in focusing, by
         (iv)(1) selecting an iteration with the largest absolute value from multiple iterations;
         (iv)(2) determining maximum absolute deviation of depth estimation for said iteration;
         (iv)(3) selecting one iteration from remaining iterations if the maximum deviation is determined to be above a desired threshold; and
         (iv)(4) repeating the above two steps until an iteration is found with maximum deviation that is below said desired threshold, or until no more iterations remain;
      (v) performing steps (i) through (iv) at multiple focus positions to arrive at an accurate depth estimation; and
      (vi) adjusting focus with a focusing movement performed in response to said accurate depth estimation.

19. The apparatus recited in claim 18, wherein said one iteration from remaining iterations is selected based on determining largest absolute value of remaining iterations.

20. The apparatus recited in claim 18, further comprising programming executable on said computer processor for reducing said multiple focus positions by one lens position if no more iterations remain.

21. The apparatus recited in claim 18, wherein said adjusting focus is performed by programming executable on said computer processor in response to combining present and previous depth estimations instead of only utilizing most recent depth estimations.

22. The apparatus recited in claim 18, wherein said first and second depth estimation from said capturing object images is performed by programming executable on said computer processor between captured image pairs, each image of which is taken at a different focus position, and estimating actual depth based on a depth estimation method between captured images within the image pair.

23. The apparatus recited in claim 18, wherein said depth estimation is performed by programming executable on said computer processor using maximum likelihood estimation (MLE) of subject depth.

24. The apparatus recited in claim 18, wherein said apparatus is a component of a still image camera.

25. The apparatus recited in claim 18, wherein said one iteration from remaining iterations is selected based upon largest absolute value of remaining iterations.

26. The apparatus recited in claim 18, further comprising programming executable on said computer processor for reducing said multiple focus positions by one lens position if no more iterations remain.

27. An apparatus for controlling automatic focus, comprising:
(a) an imaging device;
(b) a focus control element coupled to said imaging device and providing a focal range to said imaging device;
(c) a computer processor coupled to said imaging device and said focus control element and configured for controlling said imaging device and associated focus control element; and
(d) programming executable on said computer processor for carrying out an autofocusing process comprising:
(i) capturing object images;
(ii) performing a first depth estimation method on said images;
(iii) performing a second depth estimation method on said images;
(iv) selecting said first depth estimation method, or said second depth estimation method, based on comparing their results for use in focusing;
(v) performing steps (i) through (iv) at multiple focus positions to arrive at an accurate depth estimation;
(vi) adjusting focus with a focusing movement performed in response to said accurate depth estimation; and
(vii) performing slope correction between a blur matching curve and a calibrated model for said first depth estimation method, or said second depth estimation method, or a combination of said first and second depth estimation methods.

28. The apparatus recited in claim 27, wherein said adjusting focus is performed by programming executable on said computer processor in response to combining present and previous depth estimations instead of only utilizing most recent depth estimations.

29. The apparatus recited in claim 27, wherein said first and second depth estimation from said capturing object images is performed by programming executable on said computer processor between captured image pairs, each image of which is taken at a different focus position, and estimating actual depth based on a depth estimation method between captured images within the image pair.

30. The apparatus recited in claim 27, wherein said depth estimation is performed by programming executable on said computer processor using maximum likelihood estimation (MLE) of subject depth.

31. The apparatus recited in claim 27, wherein said apparatus is a component of a still image camera.

32. An apparatus for controlling automatic focus, comprising:
(a) an imaging device;
(b) a focus control element coupled to said imaging device and providing a focal range to said imaging device;
(c) a computer processor coupled to said imaging device and said focus control element and configured for controlling said imaging device and associated focus control element; and
(d) programming executable on said computer processor for carrying out an autofocusing process comprising:
(i) capturing object images;
(ii) performing a first depth estimation method on said images;
(iii) performing a second depth estimation method on said images;
(iv) selecting said first depth estimation method, or said second depth estimation method, based on comparing their results for use in focusing;
(v) performing steps (i) through (iv) at multiple focus positions to arrive at an accurate depth estimation; and
(vi) adjusting focus with a focusing movement performed in response to said accurate depth estimation; and
(vii) performing slope correction of blur matching data in response to multiplying matching iteration numbers by a constant to accurately fit the calibrated model of blur matching.

33. An apparatus for controlling automatic focus, comprising:
(a) an imaging device;
(b) a focus control element coupled to said imaging device and providing a focal range to said imaging device;
(c) a computer processor coupled to said imaging device and said focus control element and configured for controlling said imaging device and associated focus control element; and
(d) programming executable on said computer processor for carrying out an autofocusing process comprising:
(i) capturing object images;
(ii) performing a first depth estimation method on said images;
(iii) performing a second depth estimation method on said images;
(iv) selecting said first depth estimation method, or said second depth estimation method, based on comparing their results for use in focusing;
(v) performing steps (i) through (iv) at multiple focus positions to arrive at an accurate depth estimation;
(vi) adjusting focus with a focusing movement performed in response to said accurate depth estimation; and
(vii) performing slope correction of a calibrated model of blur matching by multiplying slope by a constant to accurately fit matching data samples.

* * * * *